US012195081B2

(12) United States Patent
Strauss et al.

(10) Patent No.: US 12,195,081 B2
(45) Date of Patent: Jan. 14, 2025

(54) STEERING SENSOR ASSEMBLY

(71) Applicant: DANA ITALIA S.R.L., Trentino (IT)

(72) Inventors: Alessandro Strauss, Arco (IT); Giovanni Mariech, Arco (IT); Mario Bonora, Arco (IT); Alberto Cis, Arco (IT)

(73) Assignee: DANA ITALIA S.R.L., Arco (IT)

( * ) Notice: Subject to any disclaimer, the term of this patent is extended or adjusted under 35 U.S.C. 154(b) by 0 days.

(21) Appl. No.: 18/298,083

(22) Filed: Apr. 10, 2023

(65) Prior Publication Data

US 2023/0322302 A1 Oct. 12, 2023

(30) Foreign Application Priority Data

Apr. 11, 2022 (DE) .................. 10 2022 203 618.2

(51) Int. Cl.
*B62D 15/02* (2006.01)
*B62D 7/18* (2006.01)

(52) U.S. Cl.
CPC ............ *B62D 15/023* (2013.01); *B62D 7/18* (2013.01); *B62D 15/02* (2013.01)

(58) Field of Classification Search
CPC ........ B62D 15/023; B62D 7/18; B62D 15/02; B60B 35/16
See application file for complete search history.

(56) References Cited

U.S. PATENT DOCUMENTS

| | | | | | |
|---|---|---|---|---|---|
| 3,219,372 | A | * | 11/1965 | Herbenar | B62D 7/16 280/93.508 |
| 3,438,646 | A | * | 4/1969 | Martin | B62D 17/00 280/93.5 |
| 4,029,337 | A | * | 6/1977 | Bishop | B62D 17/00 280/93.5 |
| 4,372,418 | A | * | 2/1983 | Dangel | B60G 13/006 180/256 |
| 4,545,601 | A | * | 10/1985 | Muller | B60G 3/26 267/67 |
| 4,582,338 | A | * | 4/1986 | Colanzi | F16F 9/54 301/125 |
| 4,679,957 | A | * | 7/1987 | Bauer | F16C 11/0619 403/115 |
| 4,775,026 | A | * | 10/1988 | Sollbach | F16H 48/24 475/150 |
| 4,798,394 | A | * | 1/1989 | Pollock | B62D 7/18 280/93.512 |
| 4,944,524 | A | * | 7/1990 | Achenbach | F16F 1/505 267/221 |
| 4,962,834 | A | * | 10/1990 | Miner | B60G 15/067 267/221 |
| 4,995,633 | A | * | 2/1991 | Santo | B60G 15/062 280/124.145 |

(Continued)

*Primary Examiner* — Timothy Wilhelm
(74) *Attorney, Agent, or Firm* — McCoy Russell LLP

(57) ABSTRACT

The present document relates to a steering sensor assembly comprising an axle housing and a kingpin rotatably mounted on the axle housing, wherein the kingpin features a through hole extending through the kingpin. The steering sensor assembly further comprises a mounting member connected to the axle housing and at least partially disposed in the through hole extending through the kingpin, and a steering sensor comprising a first sensor portion coupled to the kingpin and a second sensor portion coupled to the mounting member.

18 Claims, 2 Drawing Sheets

(56) References Cited

U.S. PATENT DOCUMENTS

| | | | | |
|---|---|---|---|---|
| 5,326,084 A * | | 7/1994 | Mevissen | B60G 21/0551 267/221 |
| 5,636,703 A * | | 6/1997 | Papke | B62D 15/02 180/446 |
| 5,767,767 A * | | 6/1998 | Lima | B60R 16/037 340/440 |
| 5,772,168 A * | | 6/1998 | Nakazawa | B60G 13/006 248/300 |
| 5,797,618 A * | | 8/1998 | Brokholc | B60G 99/00 280/124.149 |
| 6,089,582 A * | | 7/2000 | Hasshi | B62D 7/18 280/93.512 |
| 6,126,177 A * | | 10/2000 | Steinert | B60G 17/01933 280/DIG. 1 |
| 6,261,182 B1 * | | 7/2001 | Chino | F16D 3/20 464/100 |
| 6,269,920 B1 * | | 8/2001 | Handke | B60G 15/07 280/124.145 |
| 6,293,022 B1 * | | 9/2001 | Chino | B62D 15/023 33/203.18 |
| 6,305,701 B1 * | | 10/2001 | Bobinger | B60G 21/0551 280/124.145 |
| 6,311,402 B1 * | | 11/2001 | Brandl | G01D 5/04 33/1 PT |
| 6,341,678 B1 * | | 1/2002 | Hoyte | B60G 15/07 188/321.11 |
| 6,367,830 B1 * | | 4/2002 | Annequin | B60G 15/063 280/124.145 |
| 6,494,471 B2 * | | 12/2002 | Lukac | B60G 17/019 280/93.5 |
| 6,502,839 B1 * | | 1/2003 | Chino | B62D 7/18 33/1 PT |
| 6,533,230 B2 * | | 3/2003 | Fullenkamp | B60G 15/07 248/300 |
| 6,568,696 B2 * | | 5/2003 | Osborn | B62D 15/023 280/93.5 |
| 6,715,777 B2 * | | 4/2004 | Sasse | B60G 15/07 267/218 |
| 6,883,816 B2 * | | 4/2005 | Baker | F16C 33/586 280/93.512 |
| 6,959,497 B2 * | | 11/2005 | Leidinger | G01D 5/34738 33/534 |
| 7,097,184 B2 * | | 8/2006 | Kapaan | B62D 15/02 280/93.512 |
| 7,296,810 B2 * | | 11/2007 | Thannikary | G01D 11/245 280/93.5 |
| 7,347,433 B2 * | | 3/2008 | Pressler | B62D 15/023 280/93.5 |
| 7,405,557 B2 * | | 7/2008 | Spratte | B60G 7/005 324/261 |
| 7,413,201 B2 * | | 8/2008 | Freytag | B60G 3/24 403/27 |
| 7,490,840 B2 * | | 2/2009 | Luttinen | B60G 3/06 280/124.126 |
| 7,530,586 B2 * | | 5/2009 | Tardy-Tuch | B60G 13/005 280/124.145 |
| 7,543,831 B2 * | | 6/2009 | Pope | B62D 15/023 280/93.5 |
| 7,574,926 B2 * | | 8/2009 | Anderson | A01D 46/08 73/862.325 |
| 7,614,629 B2 * | | 11/2009 | Dinakaran | B60G 7/008 280/93.512 |
| 7,712,753 B2 * | | 5/2010 | McCann | B60G 3/06 280/93.511 |
| 7,988,166 B2 * | | 8/2011 | Heeren | B60G 13/006 280/124.1 |
| 8,025,116 B2 * | | 9/2011 | Rogg | B60K 7/0007 180/65.6 |
| 8,061,726 B2 * | | 11/2011 | Kunert | B60G 3/20 280/124.144 |
| 8,240,688 B2 * | | 8/2012 | Miyamoto | F16F 1/377 280/124.152 |
| 8,579,312 B2 * | | 11/2013 | Koumura | B60G 21/0551 280/124.152 |
| 8,708,356 B2 * | | 4/2014 | Rohde | B60G 3/06 280/124.145 |
| 8,777,244 B2 * | | 7/2014 | Seethaler | B60G 3/06 280/124.17 |
| 8,919,794 B2 * | | 12/2014 | Kunert | B60G 21/0551 280/124.152 |
| 9,004,511 B1 * | | 4/2015 | Rosepiler | B60G 21/0551 280/124.109 |
| 9,085,302 B2 * | | 7/2015 | Borroni-Bird | B60T 13/74 |
| 9,272,729 B2 * | | 3/2016 | Minoshima | B62D 5/06 |
| 9,447,832 B2 * | | 9/2016 | Todd | B60T 17/088 |
| 9,580,108 B2 * | | 2/2017 | Mentzel | B60G 15/07 |
| 9,676,240 B2 * | | 6/2017 | Hinz | B60G 15/12 |
| 9,878,588 B2 * | | 1/2018 | Von Hasselbach | B60G 3/01 |
| 9,964,457 B2 * | | 5/2018 | Duff | G01M 17/007 |
| 10,173,487 B2 * | | 1/2019 | von der Haar | F16C 11/06 |
| 10,618,554 B2 * | | 4/2020 | Passero | B62D 7/18 |
| 10,836,230 B2 * | | 11/2020 | Hintzen | B60G 3/06 |
| 10,906,372 B2 * | | 2/2021 | Shibuya | B60K 7/0007 |
| 10,926,596 B2 * | | 2/2021 | Lorenz | B60G 3/20 |
| 11,230,154 B2 * | | 1/2022 | Høiland | B60G 21/0551 |
| 11,352,056 B2 * | | 6/2022 | Moon | B60G 7/005 |
| 11,465,489 B2 * | | 10/2022 | Nagayama | B60G 3/06 |
| 11,713,076 B2 * | | 8/2023 | Avigur | B60G 17/019 280/93.502 |
| 11,859,658 B2 * | | 1/2024 | Kerner | F16C 11/0609 |
| 2002/0135213 A1 * | | 9/2002 | Fullenkamp | B60G 15/063 297/311 |
| 2004/0140640 A1 * | | 7/2004 | Frantzen | B60G 21/0551 280/124.145 |
| 2007/0001416 A1 * | | 1/2007 | Freytag | B60G 3/24 280/93.512 |
| 2007/0045036 A1 * | | 3/2007 | Takeuchi | B62D 5/0418 280/124.145 |
| 2009/0057528 A1 * | | 3/2009 | Moravy | F16F 9/54 188/266.5 |
| 2010/0223974 A1 * | | 9/2010 | Kucinski | B21D 51/06 72/324 |
| 2019/0225286 A1 * | | 7/2019 | Schutt | G01L 1/142 |
| 2021/0253159 A1 * | | 8/2021 | Toyoda | B62D 15/021 |
| 2021/0339799 A1 * | | 11/2021 | Tonini | B62D 15/023 |
| 2022/0266905 A1 * | | 8/2022 | Krone | B62D 5/062 |

* cited by examiner

STEERING SENSOR ASSEMBLY

CROSS-REFERENCE TO RELATED APPLICATION

The present application claim priority to German Patent Application No. 10 2022 203 618.2, entitled "STEERING SENSOR ASSEMBLY", filed Apr. 11, 2022. The entire contents of the above-listed application is hereby incorporated by reference for all purposes.

TECHNICAL FIELD

The present disclosure relates to a steering sensor assembly.

BACKGROUND AND SUMMARY

Steering sensors are typically used in automotive vehicles to determine the angle between a steering knuckle and a stationary portion of the vehicle such as an axle housing. Known steering sensors typically comprise two sensors portions, wherein a first sensor portion is fixed relative to the steering knuckle and the second sensor portion is fixed relative to a stationary portion of the vehicle.

However, there is demand for steering axle sensors with improved accuracy and longevity.

Various embodiments of a steering sensor assembly meeting this demand is disclosed herein.

The presently proposed steering sensor assembly comprises:
- an axle housing,
- a kingpin rotatably mounted on the axle housing, the kingpin featuring a through hole extending through the kingpin,
- a mounting member connected to the axle housing and at least partially disposed in the through hole extending through the kingpin, and
- a steering sensor comprising a first sensor portion coupled to the kingpin and a second sensor portion coupled to the mounting member.

Coupling the second sensor portion to the mounting member which is connected to the axle housing and at least partially disposed in the through hole extending through the kingpin may improve protection of the second sensor portion from dirt and/or from lubricant. Also, coupling the second sensor portion to the mounting member may allow decoupling the second sensor portion from mechanical stress which may occur in the axle housing.

A first end of the mounting member may be received in an indentation formed in the axle housing in a form-fit so that the mounting member is rotationally fixed to the axle housing with respect to a rotation axis of the kingpin and/or of the steering sensor. For instance, the first end of the mounting member may feature one or more ground facets laterally offset from the rotation axis of the kingpin and/or of the steering sensor.

The indentation formed in the axle housing, the through hole extending through the kingpin and the mounting member may be shaped such that when the kingpin is rotatably mounted on the axle housing and the mounting member is disposed or at least partially disposed in the through hole extending through the kingpin, there is only exactly one relative angular orientation between the axle housing and the mounting member which allows the first end of the mounting member to be received in the indentation formed in the axle housing. In this manner, the process of inserting the first end of the mounting member in the indentation formed in the axle housing is protected against assembly errors (poka-yoke).

For example, the indentation formed in the axle housing may feature no rotational symmetry with respect to the rotation axis of the kingpin and/or of the steering sensor. For instance, the indentation formed in the axle housing may itself feature a discrete or continuous rotational symmetry with respect to a symmetry axis parallel to the rotation axis of the kingpin and/or of the steering sensor, but may be laterally offset from the rotation axis of the kingpin and/or of the steering sensor.

The through hole extending through the kingpin and the mounting member may be shaped such that during when the mounting member is inserted into the through hole extending through the kingpin during assembly the mounting member is rotatable relative to the kingpin. For example, the through hole extending through the kingpin may be cylindrical or conical or may comprise at least one cylindrical or conical section. A cylinder axis of the cylindrical or conical section of the through hole extending through the kingpin may then be coaxial with the rotation axis of the kingpin and/or of the steering sensor.

The mounting member may comprise a portion received in the cylindrical or conical section of the through hole extending through the kingpin in a form-fit. For example, the mounting member may be fixed relative to the kingpin in directions or in all directions perpendicular to the rotation axis of the kingpin and/or of the steering sensor. For instance, the portion of the mounting member received in the cylindrical or conical section of the through hole extending through the kingpin may itself have a cylindrical or conical shape. A diameter of the cylindrical or conical portion of the mounting member may be only slightly smaller than a diameter of the cylindrical or conical section of the through hole extending through the kingpin, for example by less than ten percent or by less than five percent. A cylinder axis of the cylindrical or conical portion of the mounting member may be coaxial with the rotation axis of the kingpin and/or of the steering sensor.

The steering sensor assembly may further comprise a sealing member disposed in between the mounting member and the kingpin. More specifically, the sealing member may be disposed in between the mounting member and a portion of the kingpin enclosing the through hole extending through the kingpin. The sealing member may be configured to seal the steering sensor from at least a section of the through hole extending through the kingpin. For instance, the sealing member may be configured to seal the steering sensor from lubricant used to lubricate the rotatable kingpin. For example, the steering sensor assembly may comprise a kingpin bearing for rotatably mounting the kingpin on the axle housing. The sealing member may then be configured to seal the steering sensor from lubricant used to lubricate said kingpin bearing. The sealing member may comprise an annular sealing member such as an o-ring. The angular sealing member may be partially received in an indentation, for example an annular indentation, formed in a surface of the mounting member.

The steering sensor assembly may further comprise an elastic member, wherein the second sensor portion is coupled to the mounting member via the elastic member. The elastic member may comprise or may be made of an elastomer such as rubber. The elastic member may be received in an indentation formed at a second end of the mounting member in a form-fit, for example in such a way that the elastic member is rotationally fixed to the mounting member, such as with respect to a rotation axis of the kingpin and/or of the steering sensor. The second sensor portion may be received in a recess formed in the elastic member in a form-fit so that the second sensor portion is rotationally fixed to the elastic member, for example with respect to a rotation axis of the kingpin and/or of the steering sensor.

The steering sensor assembly may further comprise a connection member at least partially disposed in a through hole extending through the mounting member, the connection member fixing the mounting member to the axle housing. The connection member may comprise a male threaded portion engaged or configured to be engaged with a female threaded portion formed in the axle housing. The connection member may comprise an increased diameter portion. A portion of the mounting member enclosing the through hole extending through the mounting member may form a shoulder portion which forms a seat for the increased diameter portion of the connection member.

The steering sensor assembly may further comprise a steering knuckle, wherein the kingpin is fixed to the steering knuckle, for example via one or more connection members such as screws, rivets or bolts.

An embodiment of the presently proposed steering sensor assembly is described in the following detailed description and is depicted in the accompanying drawing. In the figures

DETAILED DESCRIPTION

Figure 1:
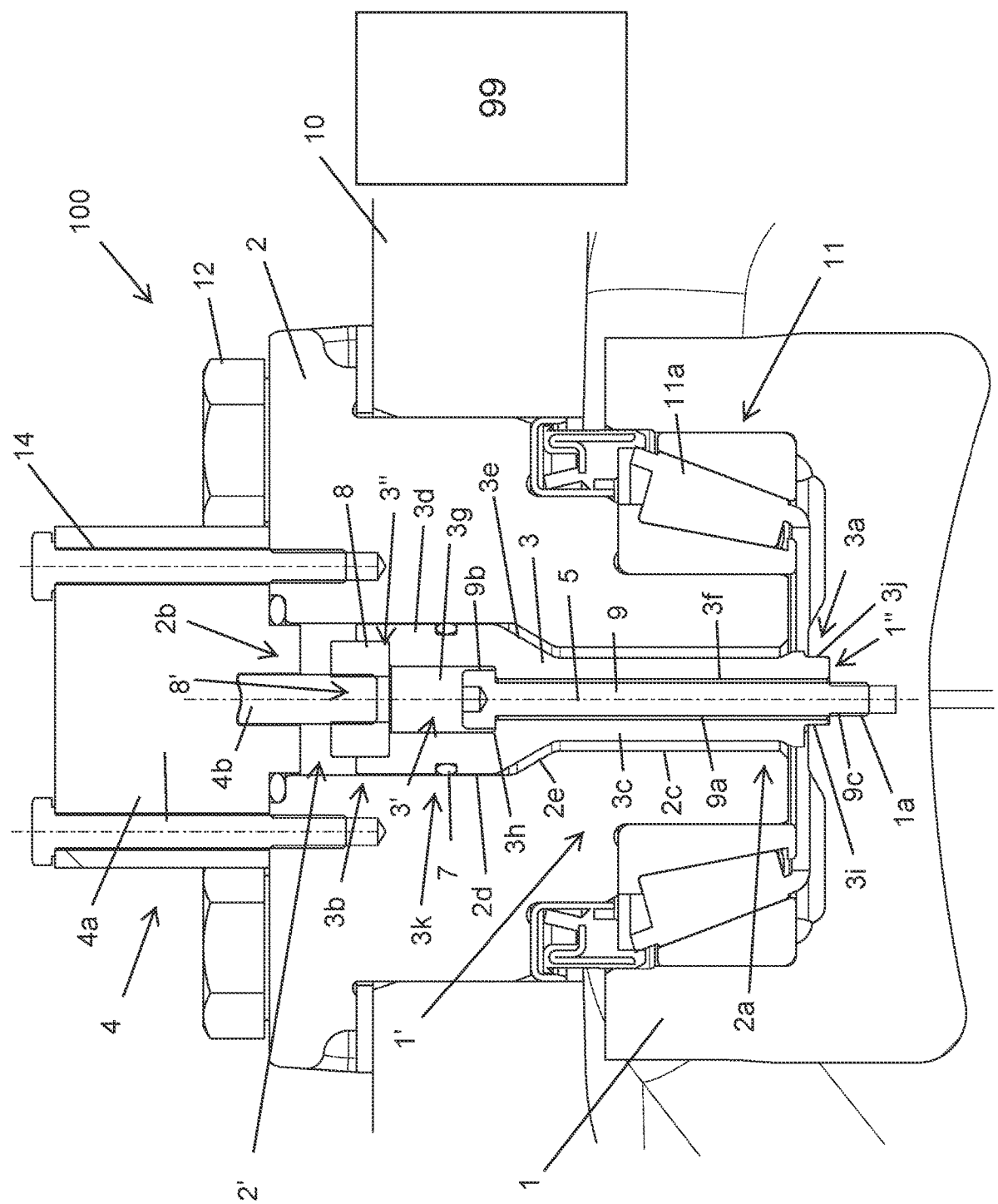
FIG. 1 schematically shows a first sectional view of an embodiment of a steering sensor assembly.

FIG. 1 schematically illustrates a sectional view of an embodiment of a steering sensor assembly 100. The assembly 100 may be used in a vehicle, for example in an off-highway vehicle such as a tractor, a harvester, a wheeled loader, a dumper, a wheeled excavator, or the like. The assembly 100 comprises an axle housing 1, a kingpin 2, a mounting member 3 and a steering sensor 4. The axle housing 1 is typically stationary with respect to the vehicle on which the assembly 100 is mounted. The kingpin 2 is rotatably mounted in a recess 1' formed in the axle housing 1, for example by means of a bearing 11. For instance, in other embodiments, the kingpin 2 may be rotatably mounted in the recess 1' by means of a bushing. In the embodiment depicted here, the bearing 11 comprises a plurality of conical rollers 11a. The kingpin 2 is fixed to a steering knuckle 10, for example via a plurality of screws 12. The bearing 11 allows the kingpin 2 and the steering knuckle 10 fixed or secured to the kingpin 2 to rotate relative to the axle housing 1 with respect to a rotation axis or steering axis 5 defining an axial direction. Usually, the steering knuckle 10 is fixedly connected to or formed in one piece with a wheel hub or spindle of a vehicle. A vehicle wheel of a vehicle, both represented by element 99, may be rotatably mounted on the wheel hub or spindle. The vehicle including the steering sensor assembly 100 may then be steered by rotating the kingpin 2 and the steering knuckle 10 fixed to the kingpin 2 relative to the axle housing 1.

The steering sensor 4 may be used to measure and/or control a steering angle between the steering knuckle 10 fixed to the kingpin 2 and the axle housing 1. For example, precise control of the steering angle between the steering knuckle 10 and the axle housing 1 may be of importance in autonomous or driver-less vehicles. The steering sensor 4 includes a first sensor portion 4a and a second sensor portion 4b. The first sensor portion 4a and the second sensor portion 4b are rotatable relative to one another with respect to the rotation axis 5. The first sensor portion 4a is fixed or secured to the kingpin 2, for example by means of screws or bolts 14. The second sensor portion 4b is fixed or secured to the mounting member 3. The steering sensor 4 may be configured to produce an electromagnetic signal which is indicative of the steering angle between the steering knuckle 10 and the axle housing 1. The assembly 100 may then further include a control unit (not shown) configured to process the electromagnetic signal produced by the steering sensor 4. For example, the steering sensor 4 may be configured as an inductive sensor including an inductive element such as a coil whose electromagnetic inductance changes based on an orientation of the second sensor portion 4b relative to the first sensor portion 4a. Or the steering sensor 4 may be configured as a capacitive sensor including a capacitive element such as a capacitor whose electromagnetic capacitance changes based on the orientation of the second sensor portion 4b relative to the first sensor portion 4a.

In the embodiment depicted here, the second sensor portion 4b is connected to the mounting member 3 via an elastic member 8. The elastic member 8 may have a disk-like or block-like shape, for example. The elastic member may be made of or may comprise an elastomer such as rubber. The elastic member is received in an indentation 3" formed at the second end 3b of the mounting member 3 in a form-fit. The form-fit between the elastic member 8 and the indentation 3" or, more precisely, between the elastic member 8 and a portion of the mounting member 3 enclosing or delimiting the indentation 3" blocks relative rotation between the elastic member 8 and the mounting member 3 with respect to the rotation axis 5 or with respect to other axes parallel to the rotation axis 5. For example, the indentation 3" formed at the second end 3b of the mounting member 3 may have a non-circular shape, and the elastic member 8 may have a corresponding non-circular shape. For instance, both the indentation 3" and the elastic member 8 may have a polygonal shape. However, it is understood that the indentation 3" and the elastic member 8 may have other non-circular shapes. It is further understood that the elastic member 8 may be fixed or secured to the mounting member 3 by other means. For example, in alternative embodiments the elastic member 8 may be glued or clamped to the mounting member 3.

In the embodiment illustrated in FIG. 1 the second sensor portion 4b is received in an indentation 8' formed in the elastic member 8 in a form-fit. That is, the second sensor portion 4b is blocked from rotating relative to the elastic member 8 with respect to the rotation axis 5 or with respect to other axes parallel to the rotation axis 5. For example, the indentation 8' formed in the elastic member 8 may have a non-circular shape, and the second sensor portion 4b may have a corresponding non-circular shape. For instance, both the indentation 8' and the second sensor portion 4b may have a polygonal shape. However, it is understood that the indentation 8' and the second sensor portion 4b may have other non-circular shapes. It is further understood that the second sensor portion 4b may be fixed or secured to the elastic member 8 by other means. For example, in alternative embodiments the second sensor portion 4b may be glued or clamped to the elastic member 8.

The flexibility of the elastic member 8 ensures easy assembly of the steering sensor 4. Further, coupling the second sensor portion 4b to the mounting member 3 via the elastic member 8 may allow the second sensor portion 4b to adjust to possible misalignments which may result from manufacturing tolerances.

The kingpin 2 comprises or features a through hole 2' extending through the kingpin 2 in the axial direction. The through hole 2' has a first end 2a proximate to the axle housing 1 and a second end 2b averted from the axle housing 1 along the axial direction. In the embodiment depicted here, the through hole 2' is cylindrically symmetric with respect to the rotation axis 5 at least in some sections. More specifically, the through hole 2' comprises a first cylindrical section 2c, a second cylindrical section 2d and a conical section 2e. A diameter of the first cylindrical section 2c is smaller than a diameter of the second cylindrical section 2d. The first cylindrical section 2c extends to or is disposed proximate to the first end 2a of the through hole 2', and the second cylindrical section 2d extends to or is disposed proximate to the second end 2b of the through hole 2'. The conical section 2e is disposed in between the first cylindrical section 2c and the second cylindrical section 2d. The conical section 2e connects the first cylindrical section 2c with the second cylindrical section 2d.

The mounting member 3 is at least partially disposed or received in the through hole 2' extending through the kingpin 2. The mounting member 3 is received in the through hole 2' in a form-fit. More specifically, the form-fit between the through hole 2' and the mounting member 3 or, more precisely, between the portion of the kingpin 2 enclosing the through hole 2" and the mounting member 3 fixes the mounting member 3 relative to the kingpin 2 in directions or in all directions perpendicular to the rotation axis 5 of the kingpin 2.

In the embodiment depicted here, the mounting member 3 is an elongate member having a pin-like or dowel-like shape. However, it is understood that in other embodiments not explicitly depicted here the mounting member 3 may have other shapes. Here, the mounting member 3 is formed in one piece. The mounting member 3 has a first end 3a and a second end 3b and extends along the axial direction. In the embodiment depicted here, the mounting member 3 has a first cylindrical portion 3c proximate to the first end 3a of the mounting member 3, a second cylindrical portion 3d proximate to the second end 3b of the mounting member 3, and a conical portion 3e. The conical portion 3e is disposed in between the first cylindrical portion 3c and the second cylindrical portion 3e and connects the first cylindrical portion 3c to the second cylindrical portion 3d.

The first end 3a of the mounting member 3 protrudes from the through hole 2', more specifically from the first end 2a of the through hole 2'. The mounting member 3 is connected to the axle housing 1 at its first end 3a. The first end 3a of the mounting member 3 is received in an indentation 1" formed in the axle housing 1. The indentation 1" is disposed or formed at the bottom of the recess 1' of the axle housing 1. The first end 3a of the mounting member 3 is received in the indentation 1" in a form-fit. More specifically, the form-fit between the indentation 1" and the first end 3a of the mounting member 3 or, more precisely, between the portion of the axle housing 1 enclosing the indentation 1" and the first end 3a of the mounting member 3 blocks rotation of the mounting member 3 relative to the axle housing 1 with respect to the rotation axis 5 or with respect to other axes parallel to the rotation axis 5.

When the first end 3a of the mounting member 3 is received or fully received in the indentation 1" formed in the axle housing 1, as shown in FIG. 1, the cylindrical portions 3c, 3d and the conical portion 3e of the mounting member 3 are disposed coaxially with the rotation axis 5 of the kingpin 2. Further, when the first end 3a of the mounting member 3 is received or fully received in the indentation 1" formed in the axle housing 1, as shown in FIG. 1, the cylindrical portions 3c, 3d and the conical portion 3e of the mounting member 3 are received or disposed in the cylindrical sections 2c, 2d and in the conical section 2e of the through hole 2' extending through the kingpin 2, respectively.

A diameter of the first cylindrical portion 3c of the mounting member 3 is only slightly smaller than a diameter of the first cylindrical section 2c of the through hole 2' extending through the kingpin 2, for example by less than 10 percent or by less than 5 percent. Similarly, a diameter of the second cylindrical portion 3d of the mounting member 3 is only slightly smaller than a diameter of the second cylindrical section 2d of the through hole 2' extending through the kingpin 2, for example by less than 10 percent or by less than 5 percent. In this manner, when, during assembly, the first cylindrical section 3c of the mounting member 3 is received or at least partially received in the first cylindrical section 2c of the through hole 2' extending through the kingpin 2, the mounting member 3 may be rotated relative to the kingpin 2, such as with respect to the rotation axis 5 of the kingpin 2, but the mounting member 3 may not be moved relative to the kingpin 2 in directions perpendicular to the rotation axis 5 of the kingpin 2.

The mounting member 3 further comprises or features a through hole 3' extending through the mounting member 3 in the axial direction. The through hole 3' extends all the way from the first end 3a of the mounting member 3 to the second end 3b of the mounting member 3. The through hole 3' comprises a first section 3f proximate to or extending to the first end 3a of the mounting member 3, and a second section 3g proximate to or extending to the second end 3b of the mounting member. A diameter of the first section 3f of the through hole 3' is smaller than a diameter of the second section 3g of the through hole 3'. In the embodiment depicted here, both the first section 3f and the second section 3g of the through hole 3' have a cylindrical shape. In the embodiment shown in FIG. 1, the through hole 3' is coaxial with the rotation axis 5 of the kingpin 2. At a position along the axial direction where the first section 3f of the through hole 3' transitions into the second section 3g of the through hole 3', a portion of the mounting member 3 enclosing the through hole 3' forms a shoulder portion 3h.

The assembly 100 further includes a connection member or screw 9 which is partially received in the through hole 3'. The connection member 9 is an elongate member extending along the axial direction. The connection member 9 has a first portion 9a and a second portion 9b. Here, the first portion 9a and the second portion 9b of the connection member are formed in one piece. A diameter of the first portion 9a is smaller than a diameter of the second portion 9b, the second portion 9b thereby forming an increased diameter portion of the connection member 9. The second portion 9b of the connection member 9 is disposed in the second section 3g of the through hole 3' extending through the mounting member 3. The second portion 9b of the connection member 9 rests on or is supported on the shoulder portion 3h of the mounting member 3. In this way, the shoulder portion 3h of the mounting member 3 forms a seat portion for the second portion 9b of the connection member 9.

The first portion 9a of the connection member 9 extends through the first section 3f of the through hole 3' and protrudes from the through hole 3' at the first end 3a of the mounting member 3. A portion of the connection member 9 protruding from the through hole 3' has a male threaded portion 9c which is engaged with a corresponding female threaded portion 1a formed in the axle housing 1, the connection member 9 thereby fixing or securing the mounting member 3 to the axle housing 1. The female threaded portion 1a extends from the indentation 1" in the axial direction.

Figure 2:
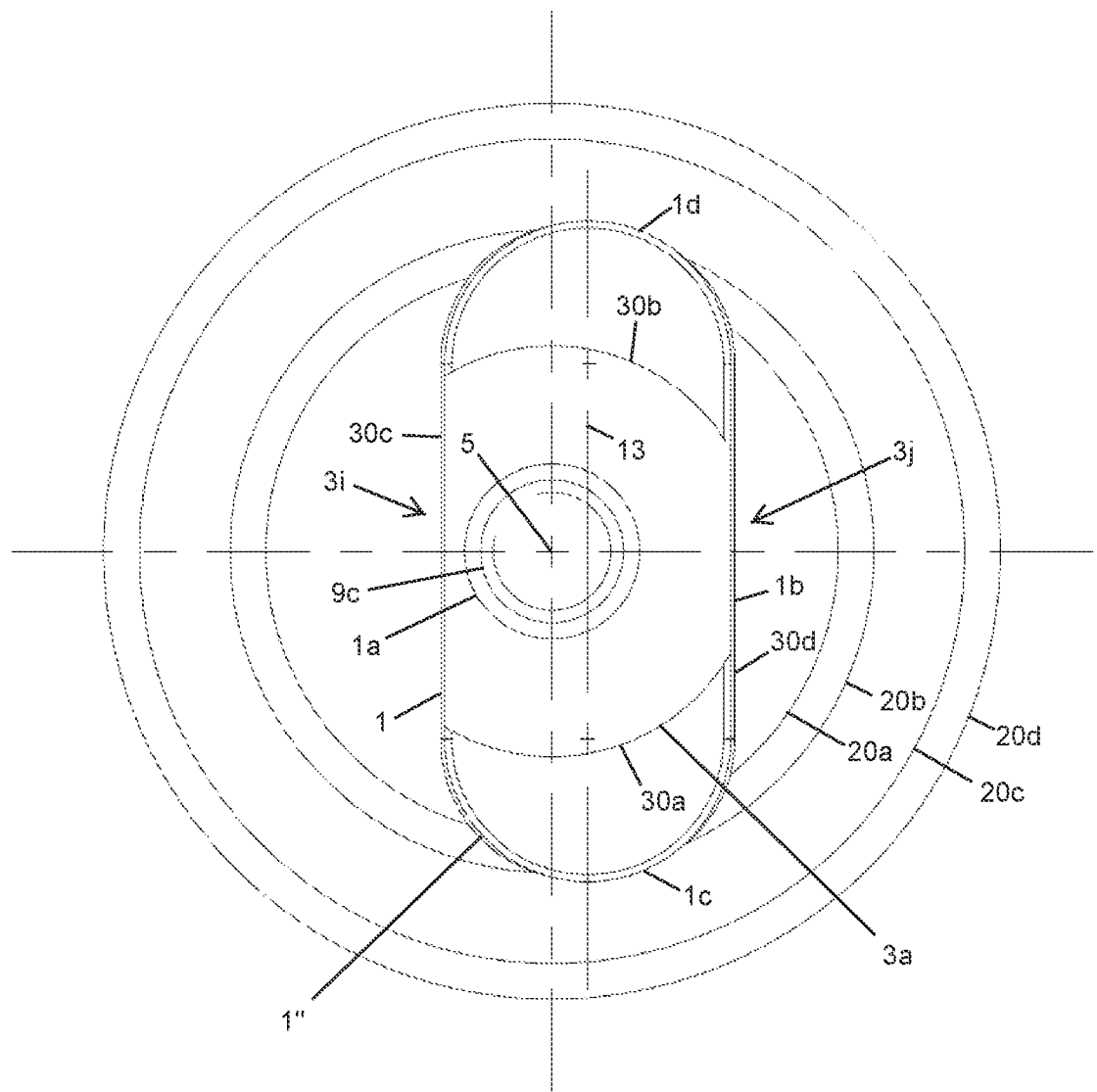
FIG. 2 schematically shows a second sectional view of the embodiment of FIG. 1.

FIG. 2 schematically shows a plan view of the mounting member 3 received in the through hole 2' extending through the kingpin 2 and in the indentation 1" formed in the axle housing 1, and of the connection member 9 securing the mounting member 9 to the axle housing 1. In FIG. 2, the direction of view is along the rotation axis 5 of the kingpin 2 and pointing from the second end 3b of the mounting member 3 to the first end 3a of the mounting member 3. Or in other words, FIG. 2 shows projections of the contour of the female threaded portion 1a of the axle housing 1, of the male threaded portion 9c of the connection member 9, of the indentation 1" formed in the axle housing 1, and of the first end 3a of the mounting member 3 onto a plane perpendicular to the rotation axis 5 of the kingpin 2. FIG. 2 further shows projections of machined structures 20a-d formed in the axle housing 1.

In the embodiment depicted in the figures, the indentation 1" or a portion of the axle housing 1 enclosing the indentation 1" has a center portion 1b delimited by parallel straight edges, and rounded end portions 1c and 1d. The rotation axis 5 intersects the projection of the contour of the indentation 1" onto a plane perpendicular to the rotation axis 5. Here, the indentation 1" features a mirror symmetry with respect to a symmetry axis 13. The symmetry axis 13 of the indentation 1" is offset from the rotation axis 5 of the kingpin 2. It is understood that in alternative embodiments the indentation 1" may have other shapes. The indentation 1" features no rotational symmetry with respect to the rotation axis 5.

In the embodiment depicted here, the first end 3a of the mounting member 3 has been formed via machining, for example via grinding or abrasion. Specifically, the first end 3a of the mounting member 3 has two opposite rounded edge portions 30a, 30b and two opposite parallel straight edge portions 30c, 30d. The two parallel straight edge portions 30c, 30d have been formed by machining or grinding, thereby creating the end portion 3a with ground facets 3i, 3j. For example, the two parallel straight edge portions 30c, 30d may have been formed by grinding off portions of a previously cylindrically shaped portion. The ground facets 3i, 3j are laterally offset from the rotation axis 5 of the kingpin 2. A minimum distance of the ground facet 3i of the first end 3a of the mounting member 3 from the rotation axis 5 is greater than a minimum distance of the ground facet 3j of the first end 3a of the mounting member 3 from the rotation axis 5. When the first end 3a of the mounting member 3 is received in the indentation 1", as shown in the figures, its parallel straight edge portions 30c, 30d are aligned with and nearly abut the straight edge portions of the axle housing delimiting the indentation 1" so that the first end 3a of the mounting member 3 is received in the indentation 1" in a form-fit. In this way, rotation of the mounting member 3 with respect to the rotation axis 5 or with respect to other axes parallel to the rotation axis 5 is blocked.

From the foregoing description a person of ordinary skill appreciates that when or once the cylindrical portion 3c of the mounting member 3 is received or at least partially received in the cylindrical section 2c of the through hole 2', there is only exactly one relative angular orientation between the axle housing 1 and the mounting member 3 which allows the mounting member 3 or, more specifically, the first end 3a of the mounting member 3 to be inserted into and/or to be received in the indentation 1". In this way, correct insertion of the mounting member 3 in the indentation 1" is facilitated. For example, when or once the cylindrical portion 3c of the mounting member 3 is received in the cylindrical section 2c of the through hole 2' and contacts the axle housing 1, the mounting member 3 may be rotated relative to the rotation axis 5 until the first end 3a of the mounting member 3 slides or slips into the indentation 1" formed in the axle housing 1, as shown in FIG. 2. This type of error prevention mechanism is sometimes referred to as a poka-yoke.

The assembly 100 further comprises a sealing member 7. The sealing member 7 is disposed in between the mounting member 3 and a portion of the kingpin 2 enclosing the through hole 2' extending through the kin pin 2. Along the axial direction, the sealing member is disposed in between the first end 3a and the second end 3b of the mounting member 3. In the embodiment depicted in FIG. 1, the sealing member 7 is disposed in between the second cylindrical portion 3d of the mounting member 3 and a portion of the kingpin 2 enclosing or delimiting the second cylindrical section 2d of the through hole 2'. The sealing member 7 is configured to protect the steering sensor 4 disposed at and connected to the second end 3b of the mounting member 3 from lubricant or grease used to lubricate the bearing 11. That is, along the axial direction, the steering sensor 4 and the bearing 11 are disposed on opposite sides of the sealing member 7. In the embodiment depicted here, the sealing member 7 is implemented as an o-ring partially received in and protruding from annular indentation 3k formed in an outer surface of the mounting member 3. It is understood that in alternative embodiments of the assembly 100 the sealing member 7 may include another type of seal such as a rubber sealing ring or the like.

FIGS. 1-2 are drawn to scale (other than representative box 99), although other relative dimensions may be used, if desired.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example.

As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The invention claimed is:

1. Steering sensor assembly, comprising:
   an axle housing,
   a kingpin rotatably mounted on the axle housing, the kingpin featuring a through hole extending through the kingpin,
   a mounting member connected to the axle housing and at least partially disposed in the through hole extending through the kingpin, and
   a steering sensor comprising a first sensor portion coupled to the kingpin and a second sensor portion coupled to the mounting member, wherein the second sensor portion is coupled to the mounting member via an elastic member, and wherein the elastic member is received in an indentation formed at a second end of the mounting member in a form-fit.

2. The steering sensor assembly of claim 1, wherein a first end of the mounting member is received in an indentation formed in the axle housing in a form-fit so that the mounting member is rotationally fixed to the axle housing with respect to a rotation axis of the kingpin and/or of the steering sensor.

3. The steering sensor assembly of claim 2, wherein the indentation formed in the axle housing, the through hole extending through the kingpin, and the mounting member are shaped such that when the kingpin is rotatably mounted on the axle housing and the mounting member is at least partially disposed in the through hole extending through the kingpin, there is only exactly one relative angular orientation between the axle housing and the mounting member which allows the first end of the mounting member to be received in the indentation formed in the axle housing.

4. The steering sensor assembly of claim 2, wherein the indentation formed in the axle housing features no rotational symmetry with respect to the rotation axis of the kingpin and/or of the steering sensor.

5. The steering sensor assembly of claim 2, wherein the first end of the mounting member features one or more ground facets laterally offset from the rotation axis of the kingpin and/or of the steering sensor.

6. The steering sensor assembly of claim 2, wherein the through hole extending through the kingpin comprises a cylindrical or conical section and the mounting member comprises a portion which is received in the cylindrical or conical section of the through hole extending through the kingpin in a form-fit.

7. The steering sensor assembly of claim 1, further comprising a sealing member disposed in between the mounting member and the kingpin, the sealing member sealing the steering sensor from at least a section of the through hole extending through the kingpin.

8. The steering sensor assembly of claim 7, wherein the sealing member comprises an annular sealing member received in an annular indentation formed in a surface of the mounting member.

9. The steering sensor assembly of claim 1, wherein the elastic member comprises or is made of an elastomer.

10. The steering sensor assembly of claim 1, wherein the second sensor portion is received in a recess formed in the elastic member in a form-fit so that the second sensor portion is rotationally fixed to the elastic member with respect to a rotation axis of the kingpin and/or of the steering sensor.

11. The steering sensor assembly of claim 1, further comprising a connection member at least partially received in a through hole extending through the mounting member, the connection member having a male threaded portion engaged with a female threaded portion formed in the axle housing, the connection member fixing the mounting member to the axle housing.

12. The steering sensor assembly of claim 11, wherein the connection member comprises an increased diameter portion and wherein a portion of the mounting member enclosing the through hole extending through the mounting member forms a shoulder portion which forms a seat portion for the increased diameter portion of the connection member.

13. The steering sensor assembly of claim 1, further comprising a steering knuckle, wherein the kingpin is fixed to the steering knuckle.

14. A vehicle, comprising:
   one or more wheels; and
   a steering sensor assembly, comprising:
      an axle housing, the axle housing configured to be stationary relative to the vehicle,
      a kingpin rotatably mounted on the axle housing, the kingpin featuring a through hole extending through the kingpin,
      a mounting member connected to the axle housing at a first end of the mounting member and at least partially disposed in the through hole extending through the kingpin, the mounting member configured to remain stationary relative to the axle housing, and
      a steering sensor comprising a first sensor portion coupled to the kingpin and a second sensor portion coupled to a second end of the mounting member via an elastic member disposed in the through hole, the first sensor portion configured to rotate relative to the second sensor portion.

15. The vehicle of claim 14, further comprising a steering knuckle coupled to the kingpin and a wheel hub coupled to the steering knuckle.

16. The vehicle of claim 14, wherein the steering sensor is configured to generate a signal that changes based on an orientation of the second sensor portion relative to the first sensor portion.

17. The vehicle of claim 14, wherein the second sensor portion is received in a recess formed in the elastic member in a form-fit so that the second sensor portion is rotationally fixed to the elastic member with respect to a rotation axis of the kingpin and/or of the steering sensor.

18. A steering sensor assembly, comprising:
   an axle housing,
   a kingpin rotatably mounted on the axle housing, the kingpin featuring a through hole extending through the kingpin,
   a mounting member connected to the axle housing and at least partially disposed in the through hole extending through the kingpin, and
   a steering sensor comprising a first sensor portion coupled to the kingpin and a second sensor portion coupled to the mounting member, wherein a first end of the mounting member is received in an indentation formed in the axle housing in a form-fit so that the mounting member is rotationally fixed to the axle housing with respect to a rotation axis of the kingpin and/or of the steering sensor, and wherein the indentation formed in the axle housing, the through hole extending through the kingpin, and the mounting member are shaped such that when the kingpin is rotatably mounted on the axle housing and the mounting member is at least partially disposed in the through hole extending through the kingpin, there is only exactly one relative angular orientation between the axle housing and the mounting member which allows the first end of the mounting member to be received in the indentation formed in the axle housing.

\* \* \* \* \*